3,388,867
LIQUID JET DISTRIBUTING DEVICE
Aldo Adami, Via Montegrappa 14,
Baveno, Novara, Milan, Italy
Filed Oct. 28, 1966, Ser. No. 590,352
Claims priority, application Italy, Apr. 28, 1966,
17,232
3 Claims. (Cl. 239—222)

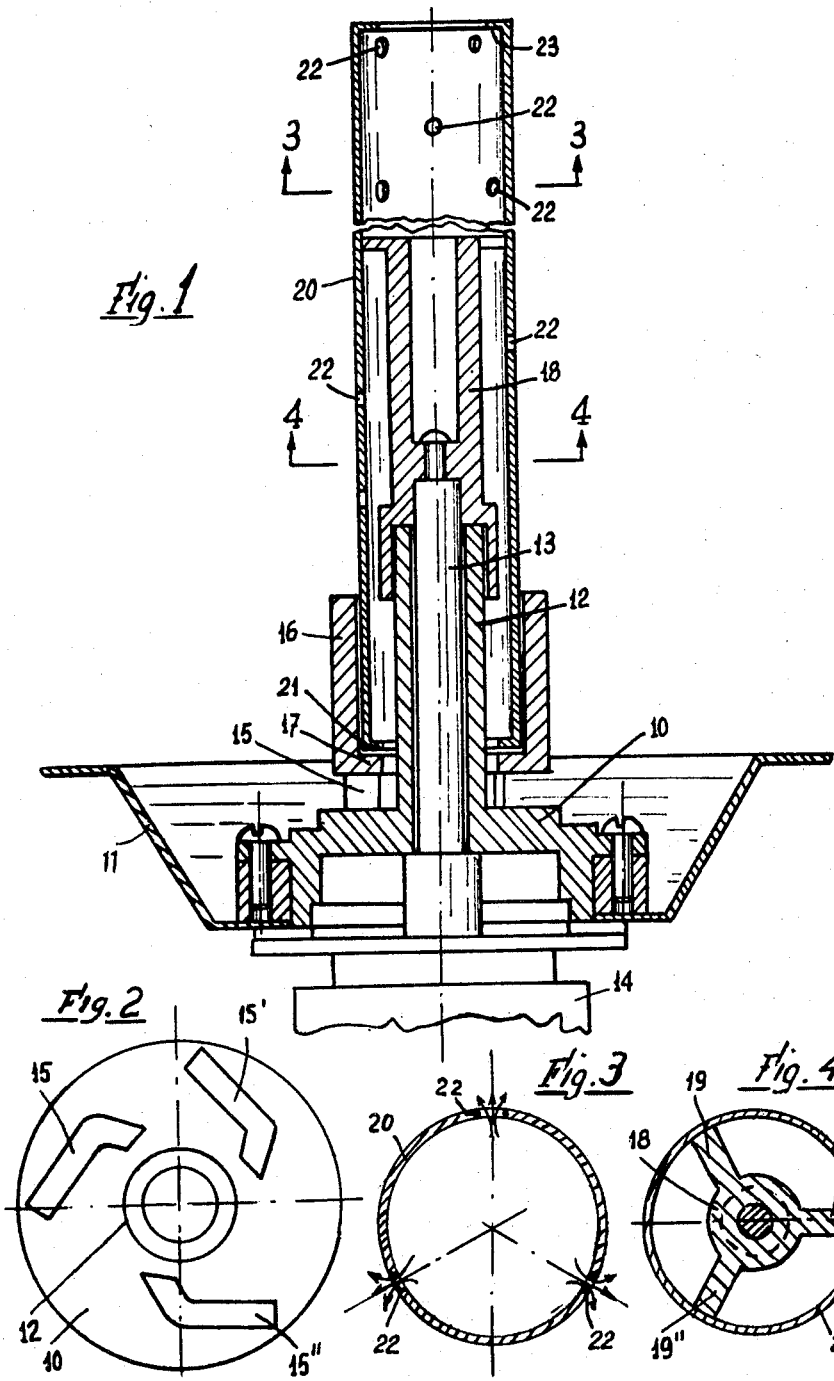

This invention relates to a liquid jet distributing device, particularly for use in dish washers and similar machines.

The known devices of this kind are associated with auxiliary devices, such as pumps, compressors and the like, whereby their structure is rendered complicated and expensive, as well as highly susceptible to trouble, which has a detrimental effect on their efficiency. The complicated structure of these known devices also requires highly skilled labor for the assembly work in addition to the high cost of the auxiliary devices.

Accordingly, it is an object of the invention to avoid the above-mentioned disadvantages and to provide a liquid jet distributing device which is of simple structure in that all auxiliary devices, such as pumps, compressors and the like, are eliminated and which has an increased efficiency compared with the known devices of this kind. Owing to the simplicity of structure such novel device is much less susceptible to trouble and, moreover, can be manufactured on a large scale at very low cost.

The liquid jet distributing dtvice proposed by the present invention substantially comprises a base flange secured to the bottom of a vessel containing liquid to be distributed, a central boss projecting from said base flange, a driving motor having a shaft rotatably accommodated in said boss, at least three symmetrically inclined radial blades provided on said base flange and spaced around said boss, a tubular socket arranged on top of said blades and provided with a radially inwardly directed circular flange at its lower end facing said base flange, an outer tube rotatably received with its lower end in said tubular socket and provided at its lower end with a radially inwardly directed circular flange exactly fitting on said flange of said tubular socket, and a coupling sleeve rigidly connecting said motor shaft and said outer tube and arranged to transmit torque from said motor shaft to said outer tube.

This device may be used, for example, as a siphon.

Another object of the invention is to provide a liquid jet distributing device of the aforedescribed general structure which is especially adapted for use in dish washers and similar machines in that said outer tube, in addition, comprises a radially inwardly directed circular flange also at its upper end, as well as a plurality of radial openings in the wall of the tube, which openings may preferably be located on directrices which are inclined with respect to the axis of the outer tube.

In operation, a powerful flow of liquid from the vessel containing the liquid into the outer tube will be produced in such a manner that the liquid rising in the outer tube in the form of a jacket on the inner periphery thereof will issue in a powerful jet from the open upper end of the outer tube or, in the preferred embodiment of the invention, in the form of a plurality of radial jets through the openings provided in the wall of the outer tube, the force of the jet or jets, respectively, increasing proportionally to the speed of rotation of the outer tube, which is due to the fact that the liquid does not fill the whole interior of the outer tube but forms a cylindrical jacket having a thickness corresponding to the radial extension of the flange at the lower end of the outer tube.

These and other objects and features of the invention will become more clearly apparent from the following description of a preferred embodiment illustrated in the accompanying drawing, in which:

FIG. 1 is an axial section through a liquid jet distributing device according to the invention;
FIG. 2 is a top plan view of the base flange of the device illustrated in FIG. 1;
FIG. 3 is a cross section taken on line 3—3 of FIG. 1, and
FIG. 4 is a cross section taken on line 4—4 of FIG. 1.

With reference now to the drawing, FIG. 1 shows a liquid jet distributing device, particularly for use in dish washers and similar machines, which comprises a base flange 10 secured to the bottom of a vessel 11 containing the liquid to be distributed. The base flange 10 is provided with a central boss 12 extending from the free end face thereof and rotatably accommodating a shaft 13 of a driving motor 14. Also provided on this end face of the flange 10 are three similar radial blades 15, 15' and 15" (FIG. 2) which are symmetrically arranged and inclined. An upwardly open tubular socket 16 is fixed above the blades 15, 15' and 15" and provided with a radially inwardly extending circular flange 17 at its lower end facing the flange 10. Secured to the upper end of the motor shaft 13 projecting from the boss 12 is a coupling sleeve 18 which, on the other hand, is rigidly connected with a long outer tube 20 by means of radial arms 19, 19' and 19" (FIG. 4). The lower end of the tube 20 is rotatably received in the tubular socket 16 and provided with a radially inwardly directed circular flange 21 similar to, and exactly fitting on, the flange 17 of the tubular socket 16. In the illustrated embodiment of the device which is designed particularly for use in dish washers and similar machines, the tube 20 is further provided with a plurality of openings 22 (FIGS. 1 and 3) passing radially through the wall of the tube and with a radially inwardly directed circular flange 23 at its upper end, which is similar to the lower end flange 21. In operation, the liquid rising peripherally in the tube 20 and forming a liquid jacket therein will be retained by the flange 23 at the upper end of the tube 20 and whizzed out through the openings 22 in the form of powerful radial jets. However, if the device is to be used as a siphon, the openings 22 and the flange 23 at the upper end of the tube 20 will be omitted. In this case, the device using a motor of only ⅛ HP is capable of lifting 120 l. of liquid per minute to the height of 2 meters, and the liquid jet will issue vertically from the open upper end of the tube 20.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. A liquid jet distributing device, comprising a base flange secured to the bottom of a vessel containing liquid to be distributed, a central boss projecting from said base flange, a driving motor having a shaft rotatably accommodated in said boss, at least three symmetrically inclined radial blades provided on said base flange and spaced around said boss, a tubular socket arranged on top of said blades and provided with a radially inwardly directed circular flange at its lower end facing said base flange, an outer tube rotatably received with its lower end in said tubular socket and provided at its lower end with a radially inwardly directed circular flange exactly fitting on said flange of said tubular socket, and a coupling sleeve rigidly connecting said motor shaft and said outer tube and arranged to transmit torque from said motor shaft to said outer tube.

2. A liquid jet distributing device, particularly for use in a dish washer and similar machines, comprising a base flange secured to the bottom of a vessel containing liquid to be distributed, a central boss projecting from said base flange, a driving motor having a shaft rotatably accommodated in said boss, at least three symmetrically inclined radial blades provided on said base flange and spaced around said boss, a tubular socket arranged on top of said blades and provided with a radially inwardly directed circular flange at its lower end facing said base flange, an outer tube rotatably received with its lower end in said tubular socket and provided at each of its ends with a radially inwardly directed circular flange and with a plurality of radial openings in its wall said flange on the lower end of said outer tube exactly fitting on said flange of said tubular socket, and a coupling sleeve rigidly connecting said motor shaft and said outer tube and arranged to transmit torque from said motor shaft to said outer tube.

3. A device as claimed in claim 2, wherein the radial openings in the wall of the outer tube are located on directrices which are inclined with respect to the axis of the outer tube.

References Cited

UNITED STATES PATENTS

| 871,191 | 11/1907 | Southam | 239—23 |
| 2,973,904 | 3/1961 | Zimmermann et al. | 239—20 |

FOREIGN PATENTS

| 585,363 | 12/1924 | France. |
| 632,179 | 9/1927 | France. |

EVERETT W. KIRBY, *Primary Examiner.*